United States Patent [19]

Gulli

[11] 4,192,538
[45] Mar. 11, 1980

[54] BUMPER CONSTRUCTION FOR MOTOR VEHICLES

[76] Inventor: Frank Gulli, 62 Livingston Ave., Dobbs Ferry, N.Y. 10522

[21] Appl. No.: 898,928

[22] Filed: Apr. 21, 1978

[51] Int. Cl.² ............................................. B61F 19/04
[52] U.S. Cl. .................................... 293/134; 293/155; 293/134
[58] Field of Search ............... 293/60, 70, 71 R, 71 P, 293/73, 85, 89, 98, 132

[56] References Cited

U.S. PATENT DOCUMENTS

| | | | |
|---|---|---|---|
| 1,172,001 | 2/1916 | Baker et al. | 293/71 P |
| 1,504,505 | 8/1924 | Reed et al. | 293/71 P |
| 2,573,510 | 10/1951 | Terranova | 293/85 |
| 3,844,544 | 10/1974 | Keilholz | 293/137 |
| 3,917,020 | 11/1975 | Saab | 293/85 X |

FOREIGN PATENT DOCUMENTS 2207560 2/1972 Fed. Rep. of Germany ......... 293/71 P
1376860 12/1974 United Kingdom ..................... 293/85

Primary Examiner—Joseph F. Peters, Jr.
Assistant Examiner—D. W. Underwood
Attorney, Agent, or Firm—William L. Fisher

[57] ABSTRACT

Improved bumper construction for motor vehicles comprising first and second bumper members, the second bumper member having brackets for mounting the same to the frame of a vehicle, the first bumper member slideably carried on the second bumper member, a flexible air container disposed between the bumper members, a yieldable member associated with the bumper members for yieldably urging the first bumper member inwardly in respect to the second bumper member and against the air container, the air container having an air inlet valve and air outlet valves, whereby, in the event of collision of the vehicle in which the first bumper member is forced inwardly thereof, air escapes from the air container at a controlled rate to absorb the energy of the collision.

1 Claim, 4 Drawing Figures

U.S. Patent   Mar. 11, 1980   4,192,538
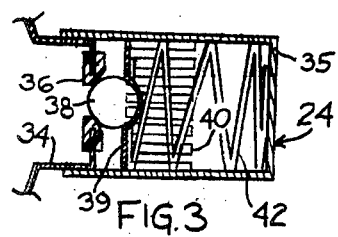
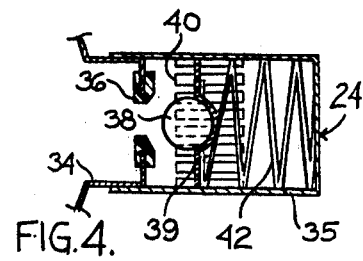
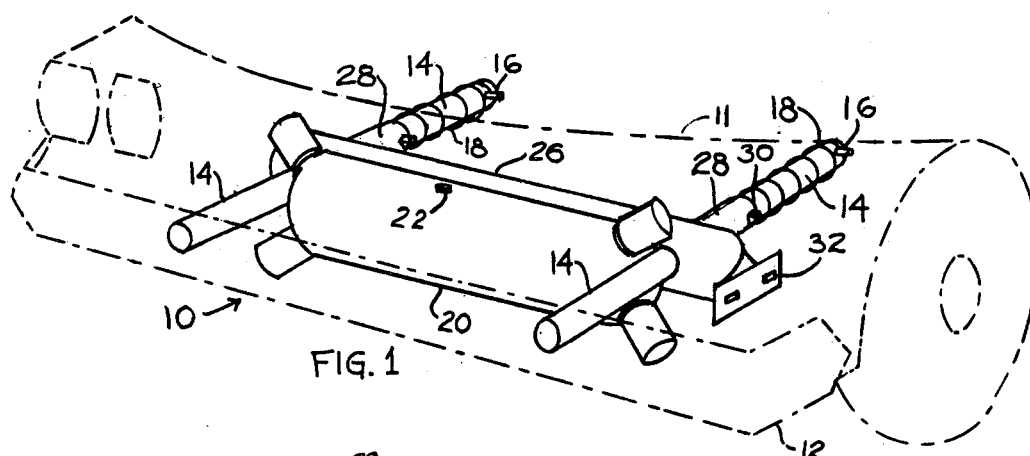
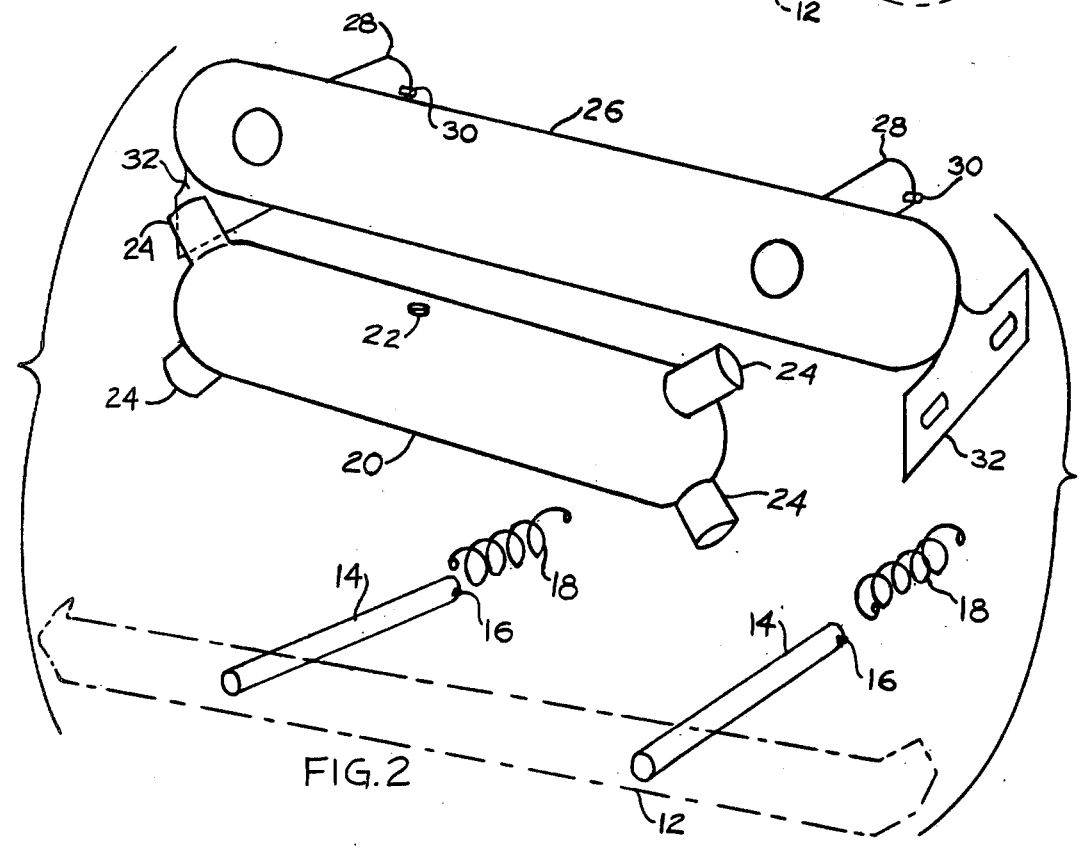

BUMPER CONSTRUCTION FOR MOTOR VEHICLES

My invention relates to motor vehicles.

The principal object of my invention is to provide an improved bumper construction for motor vehicles which diminishes the damage in the event of collisions.

The foregoing object of my invention and the advantages thereof will become apparent during the course of the following description, taken in conjunction with the accompanying drawings, in which:

FIG. 1 is a perspective view of a vehicle bumper construction embodying my invention shown installed on a motor vehicle.

FIG. 2 is an exploded view of said embodiment; and

FIGS. 3 and 4 are longitudinal cross-sectional views of an air outlet valve employed in said embodiment and shown in different operative positions.

Referring to the drawings in greater detail, 10 generally designates said embodiment which comprises a pair of pipes 14 made fast to the bumper member 12 and extending perpendicularly inwardly thereof, a second bumper member 26 and a flexible air container such as an air bag 20. Said bumper member 26 has a pair of brackets 32 by which it is made fast to the frame of a motor vehicle indicated at 11, and a pair of pipes 28 extending perpendicularly inwardly thereof. The sides of the bumper members 12 and 26 facing each other are oppositely concave. Each pipe 28 is provided with a lug 30 which projects outwardly of the outside diameter thereof. The pipes 14 are slideable in the pipes 28. The air bag 20 is elongated and shaped to fit between said pipes 28 in the space formed by the oppositely concave sides of said bumper members 12 and 26 and is made fast to one or the other of said bumper members 12 and 26.

Said air bag 20 has a conventional air inlet valve 22 and a plurality of air outlet valves 24 in the form of spring operated ball check valves, in the instance. A pair of compression springs 18 are disposed on the outside diameter of said pipes 14 and have their outer ends fastened respectively to said lugs 30. A pair of anchor bolts 16 are disposed in apertures in the inner ends of said pipes 14 and fastened thereto. The outer ends of said springs 18 are fastened to said bolts 16. Said springs 18 normally urge said bumper member 12 inwardly toward said bumper member 26 and against said air bag 20.

Each air outlet valve 24 includes a valve housing 34 suitably fastened to the flexible wall of the air bag 20. A portion of the housing 34 is cylindrical to interfit with a second cylindrical valve housing 35 fastened to said first housing 34. The housing 35 has a plurality of air outlet apertures 40 formed in the cylindrical wall thereof. A valve seat 36 is disposed in an aperture formed in the cylindrical portion of said housing 34. A ball check member 38 is moveable in respect to said valve seat 36 and is normally urged thereagainst by a compression spring 42 through the intermediary of a washer 39 having a spherical depression therein. The opposite ends of said spring 42 operate against a side of said washer 39 and a wall of said housing 35.

In operation of said device 10 the same is installed in a motor vehicle by mounting the brackets 32 in the frame thereof so that the bumper member 26 is properly positioned. The bumper member 12 is then inserted into the bumper member 26 with the air bag 20 properly positioned therebetween. The springs 18 are installed over the pipes 14 following insertion of the latter into the pipes 26 and the bolts 16 are inserted through the apertures in the pipes 14 and fastened thereto. The ends of the springs 18 are then fastened to the lugs 30 and to the bolts 16. Said air bag 20 is filled with pressure air to the recommended pressure.

In the case of a collision in which the bumper 12 is forced inwardly, the air within said air bag 20 will escape at a predetermined rate by the unseating of the ball check member 38. The operational characteristics of the air outlet valves 24 and their number are selected in relation to the volume of the air bag 20 so that the escape of air therefrom is at a controlled rate. In this way the momentum of the collision is absorbed in collapsing said air bag 20 at a controlled rate instead of damaging the colliding vehicles.

It will thus be seen that there has been provided by my invention improvements in a motor vehicle bumper construction in which the object hereinabove set forth, together with many thoroughly practical advantages, has been successfully achieved. While a preferred embodiment of my invention has been shown and described, it is to be understood that variations and changes may be resorted to without departing from the spirit of my invention as defined by the appended claims.

What I claim is:

1. Improved bumper construction for motor vehicles comprising first and second bumper members, said second bumper member having means for mounting the same to the frame of a vehicle, said first bumper member slideably carried on said second bumper member, a flexible air container means disposed between said bumper members, yieldable means associated with said bumper members for yieldably urging said first bumper member inwardly in respect to said second bumper member and against said air container means, said air container means having an air inlet valve and air outlet valve means, whereby, in the event of collision of said vehicle in which said first bumper member is forced inwardly thereof, air escapes from said air container means at a controlled rate to absorb the energy of said collision, each said bumper member having a pair of pipes extending perpendicularly inwardly thereof, the pipes of said first bumper member slideable in the pipes of said second bumper member, said air container means being an elongated cylindrical air bag of a length substantially equal to the distance between the pipes of said first bumper member, said bumper members being oppositely concave in shape to conform to the cylindrical shape of said air bag.

* * * * *